Aug. 8, 1933.  C. G. SUITS  1,921,787
PULSATION APPARATUS
Filed Jan. 23, 1931
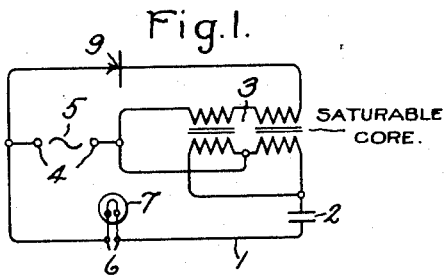
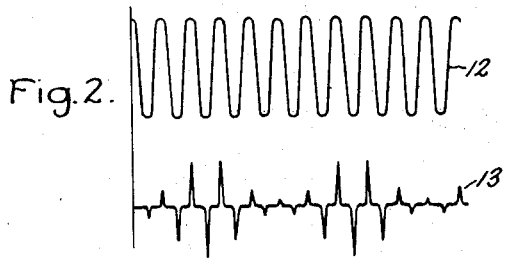
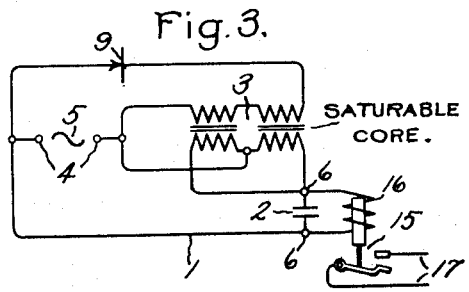
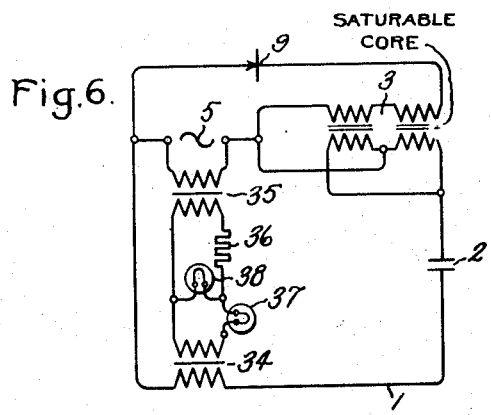
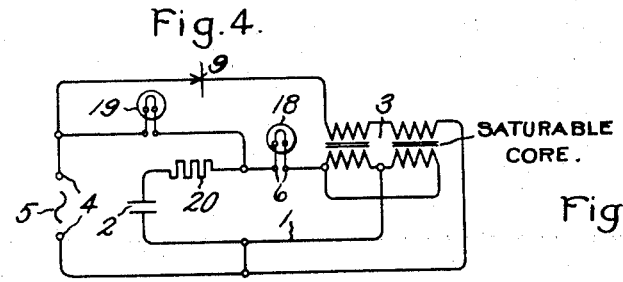
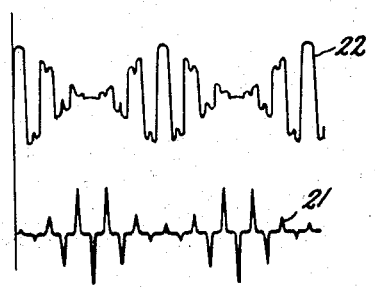
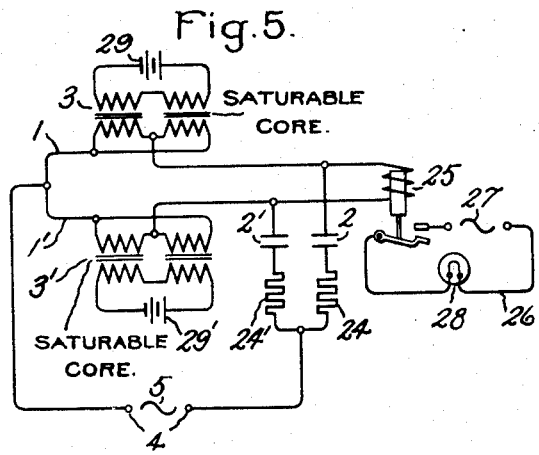
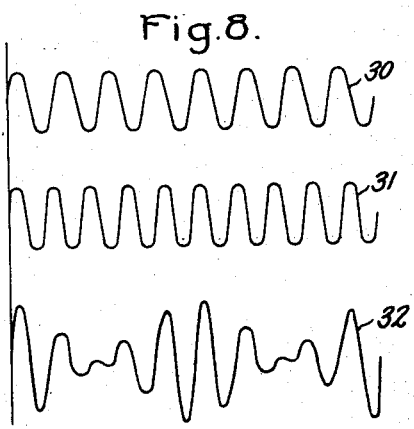
Inventor:
Chauncey G. Suits,
by Charles E. Tullar
His Attorney.

Patented Aug. 8, 1933

1,921,787

UNITED STATES PATENT OFFICE 1,921,787

PULSATION APPARATUS

Chauncey G. Suits, Schenectady, N. Y., assignor to General Electric Company, a Corporation of New York Application January 23, 1931. Serial No. 510,750

15 Claims. (Cl. 172—281)

My invention relates to electrical apparatus for producing pulsations, particularly those of relatively low frequency, the object of my invention being to provide for this purpose apparatus which has no moving parts, is purely electrical in character, is simple in construction, reliable in operation and inexpensive to manufacture.

In accordance with my invention I provide an alternating current circuit having therein series connected capacitance and inductance elements which circuit at certain times is resonant. The inductance element has a magnetic circuit which exhibits saturation characteristics, in other words is saturable, and applied to this magnetic circuit is a unidirectional magnetizing force. The alternating current circuit is arranged to be connected with a suitable alternating current source and with a load device which is responsive to the pulsations in the circuit. The capacitance and inductance elements have such values with respect to the frequency of the source that for small currents a condition of resonance obtains in the alternating current circuit. I have observed that with this arrangement of apparatus and under these conditions the current in the circuit and in the load device is pulsating in character the frequency of pulsations depending principally upon the unidirectional magnetizing force applied to the inductance element and the voltage of the alternating current source, the capacitance and the resistance of the circuit being factors of less importance. With commonplace apparatus of the nature briefly described above and supplied by 60 cycle current, I have obtained pulsation frequencies ranging from ten per second to one in many seconds. The operation of the apparatus probably is due to the fact that when a condition of resonance exists in the circuit of the capacitance and inductance elements the resulting increase of current in the inductance element causes the impedance of this reactor to rise, in a manner characteristic of biased core inductances, to such a degree that the circuit is detuned from its resonant condition. The current then drops to a low value only to rise again when resonance is thus re-established. This sequence of operations then repeats itself indefinitely.

My invention will be better understood from the following description taken in connection with the accompanying drawing, and its scope will be pointed out in the appended claims.

Referring to the drawing, Fig. 1 is a circuit diagram illustrating one embodiment of my invention; Fig. 2 shows the wave forms of the current in different parts of the circuit of Fig. 1; Figs. 3, 4, 5 and 6 are diagrams similar to Fig. 1 showing various modifications and Figs. 7 and 8 show the wave forms of the current in different parts of the circuit respectively of Figs. 4 and 5.

In Fig. 1 of the drawing I have shown the alternating current circuit 1 having in series therein the capacitance element 2 and the inductance element 3. The circuit is shown having terminals 4 by which it is adapted to be connected for excitation with a suitable alternating current source represented diagrammatically at 5. The circuit is also shown having terminals 6 by which it is adapted to be connected with a load device represented in this case as an incandescent lamp 7. The inductance element may comprise various constructions such, for example, as has been employed in certain types of reactors where a four-legged core is provided having three windings wound thereon, such a reactor being disclosed in the Alexanderson Patent No. 1,328,610, January 20, 1920. If desired the inductance element 3 may be in the form of two transformers each with its own magnetic circuit. For convenience of illustration I have chosen to show diagrammatically an inductance element 3 having such a construction. As shown in Fig. 1 the circuit 1 includes a winding of each transformer said windings being connected in parallel. For producing a unidirectional flux in the core of each transformer I have shown the two other windings of the transformers connected in series with the rectifier 9 and having a connection with the terminals 4 by which current may be supplied thereto from the source 5 and the cores magnetized thereby to the point of saturation. The windings of the transformers are so related that any alternating current induced in the direct current winding of one is opposed by that induced in the other. Hence by the use of an inductance element of this form it is possible to prevent any induced alternating current from flowing in the rectifier circuit.

In Fig. 2 I have shown at 12 the wave form of the alternating current supplied by the source 5 and at 13 I have shown the wave form of the current which flows in the circuit 1. From the latter curve it will be seen that the effective value of the current traversing the lamp 7 is pulsating in character and hence causes the lamp to alternately vary in the degree of illumination. As has already been explained above, for a low value of current in circuit 1 the inductance, capacitance, and resistance values are such that a condition of resonance exists. The current in the circuit therefore increases but due to the characteristic of biased core reactors this increased current causes an increase in the inductance of the reactor to an amount which is sufficient to detune the circuit from its resonant condition. Hence the current now decreases to its former value resulting in a decrease in the inductance of the reactor and a restoration of the resonance condition, thus the cycle repeats itself at regular intervals and at a low frequency.

The form of my invention illustrated by Fig. 3 is similar to that shown in Fig. 1 with the exception that in this case the load is shown as comprising the relay 15, the winding 16 of which is shown connected to the terminals 6 of circuit 1 and the armature arranged to control the local circuit 17.

In Fig. 4 I have shown a modified form in which the source 5 is applied to circuit 1 by a parallel connection instead of a series connection as in Figs. 1 and 2 and in which in addition to the lamp 18 corresponding to the lamp 7 of Fig. 1, I employ a second lamp 19 connected between one terminal 4 of the source 5 and a point of circuit 1 between lamp 18 and capacitance element 2. In this case also I have shown a controlling resistance 20 between lamp 18 and the capacitance element 2. With this arrangement the current in the circuit 1 and by which the lamp 18 is illuminated is shown at 21 in Fig. 7 being similar to that shown at 13 in Fig. 2. The current passing through lamp 19 is shown at 22 in Fig. 7. By an inspection of Fig. 7 it will be seen that the effective values of the currents traversing the lamps 18 and 19 undergo pulsations of the same frequency but that the pulsations have a phase displacement of substantially 180°. Hence when one lamp is brightly illuminated the other lamp burns dimly or below incandescence.

In the form of my invention illustrated by Fig. 5, I have shown an arrangement whereby I employ two alternating current circuits each similar to circuit 1 of Fig. 1 but having slightly different pulsation frequencies, and these two circuits I cause to beat together whereby a beat frequency is obtained having a much lower frequency than either of the two circuits themselves. In this figure the two alternating circuits 1 and 1' have respectively capacitance elements 2 and 2', inductance elements 3 and 3' and control resistances 24 and 24'. The load in this case is shown as comprising the relay 25 which controls local circuit 26 including the alternating current source 27 and the lamp 28. For convenience in illustration the source of current for supplying the unidirectional flux in the two inductance elements is shown as comprising batteries 29 and 29'.

Referring now to Fig. 8, if the curve 30 be taken, for example, as representing the envelope of the current wave in circuit 1, and the curve 31 be taken as representing the envelope of the current wave in circuit 1', then the resulting effective current by which the relay 25 is responsive is represented by curve 32. It will be understood that the relay is so adjusted that it will operate in response to the variations in amplitude of the current traversing its winding and thus will be caused to open and close in accordance with the variations in the effective value of the current traversing its winding.

In that form of my invention illustrated by Fig. 6, I have shown a two lamp arrangement adapted for alternate illumination in the same manner as that produced by the arrangement shown by Fig. 4. In this case there is connected in the circuit 1 the primary of the transformer 34. A second transformer 35 has its primary connected across the source 5. The secondaries of these two transformers are connected to form a series circuit including the controlling resistance 36 and the lamp 37. Bridged across this circuit between resistance 36 and lamp 37 is the lamp 38. The secondary windings of the two transformers 34 and 35 are connected to oppose each other with the result that when the current in circuit 1 is a maximum lamp 38 is illuminated brightly while lamp 37 glows dimly if at all; when the current in circuit 1 is a minimum lamp 37 glows brightly and lamp 38 glows dimly if at all.

I have chosen the particular embodiment described above as illustrative of my invention and it will be apparent that various other modifications may be made without departing from the spirit and scope of my invention which modifications I aim to cover by the appended claims.

What I claim as new and desire to secure by Letters Patent of the United States, is,—

1. Pulsation apparatus comprising in combination a capacitance element, an inductance element having a core which exhibits saturation characteristics, means for connecting said elements in a series circuit, said circuit having means by which it may be connected to a source of alternating current of fixed frequency and by which it may be connected to a load device independently of said core, and means for causing a unidirectional magnetization of said core, the capacitance and inductance elements respectively having such values that when the apparatus is connected with a source of alternating current of predetermined voltage and frequency the effective value of the alternating current in the series circuit undergoes regular recurring variations.

2. Pulsation apparatus comprising a series connected capacitance element and an inductance element having a saturable magnetic circuit, said series circuit having means independent of the magnetic circuit adapting it to be connected to a source of alternating current and to a load device, and a direct current winding interlinking said magnetic circuit for producing a unidirectional flux therein, the capacitance and inductance elements respectively having such values that when the apparatus is connected with a source of alternating current of predetermined voltage and frequency the effective value of the alternating current in the series circuit undergoes regular recurring variations.

3. Pulsation apparatus comprising a capacitance element and an inductive element having a saturable core, means connecting said elements in a series circuit, a load device conductively connected with said circuit, a direct current winding on said core, a rectifier in a series circuit with said winding, and a source of alternating current connected with both of said circuits.

4. In combination, a source of supply of alternating current, current responsive means connected to be supplied therefrom, and means composed of relatively fixed parts actuated by said alternating current for causing the effective value of the alternating current supplied to said means to pulsate with a frequency lower than that of said alternating current.

5. In combination, a source of supply of alternating current, a load device connected to be supplied therefrom and means all of whose parts are fixed relatively to each other in said connection for causing the alternating current supplied to said device to pulsate in effective value with a frequency less than the alternating frequency of the current.

6. In combination, a source of supply of alternating current, a load device, and current control means including inductance and capacitance elements connected between said source of supply and said device for causing the alternating current supplied to the device from said source to undergo regular recurring variations at a frequency less than the alternating frequency of said current.

7. In combination, a source of supply of alternating current, a load device, and means comprising a saturable core inductance element and a capacitance element connecting said source and said device for causing the alternating current supplied to said device to undergo regular recurring variations at a frequency less than the alternating frequency of said current.

8. In combination, a source of supply of alternating current, a load device, and means comprising a series circuit including a saturable core inductance element and a capacitance element connected with said source and said load device for causing the alternating current in said device to undergo pulsations having a frequency lower than the alternating current frequency.

9. Apparatus having means by which it may be connected with a source of alternating current supply and with a load device for producing pulsations in the load device having a frequency less than that of the alternating current supplied comprising a saturable core inductance element and a capacitance element connected together in series.

10. Apparatus adapted to be connected with an alternating current source for producing pulsations having a frequency less than the alternating frequency of said current comprising a capacitance element, a saturable core inductance element connected in series therewith and means for producing a unidirectional saturating flux in said core, the respective capacitance and inductance values of said element being such that the effective value of the alternating current in said series circuit successively increases and decreases in a regular manner.

11. Apparatus adapted to be connected with a source of supply of alternating current including a plurality of load devices and means for causing the alternate operation of said devices comprising a capacitance element and saturable core inductance element connected in a series circuit with one of the load devices and a supply circuit for said series circuit including another of said load devices.

12. Apparatus adapted to be connected with a source of supply of alternating current including a plurality of load devices and means for causing the alternate operation of said devices comprising a capacitance element and saturable core inductance element provided with a saturating winding connected in a series circuit with one of the load devices, a supply circuit connected with said series circuit including another of said load devices and a circuit including a rectifier and said winding.

13. Apparatus adapted to be connected with an alternating current source of supply including a load device and means for producing pulsations in said device having a frequency less than that of the alternating current comprising a plurality of circuits each including a capacitance element and a saturable core inductance element, the pulsation frequencies of the alternating current in said circuits being different from each other and means for connecting the load device between said circuits.

14. Apparatus having means by which it may be connected with a source of alternating current supply and with a load device for producing pulsations in the load device having a frequency less than that of the alternating current supplied comprising a saturable core inductance element having a saturating winding and a capacitance element connected together in series and a rectifier connected in circuit with said winding.

15. In combination, a source of supply of alternating current having a frequency of substantially sixty cycles per second, a load device, a capacitance element and a saturable core inductance element connected in a series circuit, a saturating winding for said core, a rectifier and means connecting said winding and rectifier with said source of supply.

CHAUNCEY G. SUITS.